Patented Dec. 22, 1942

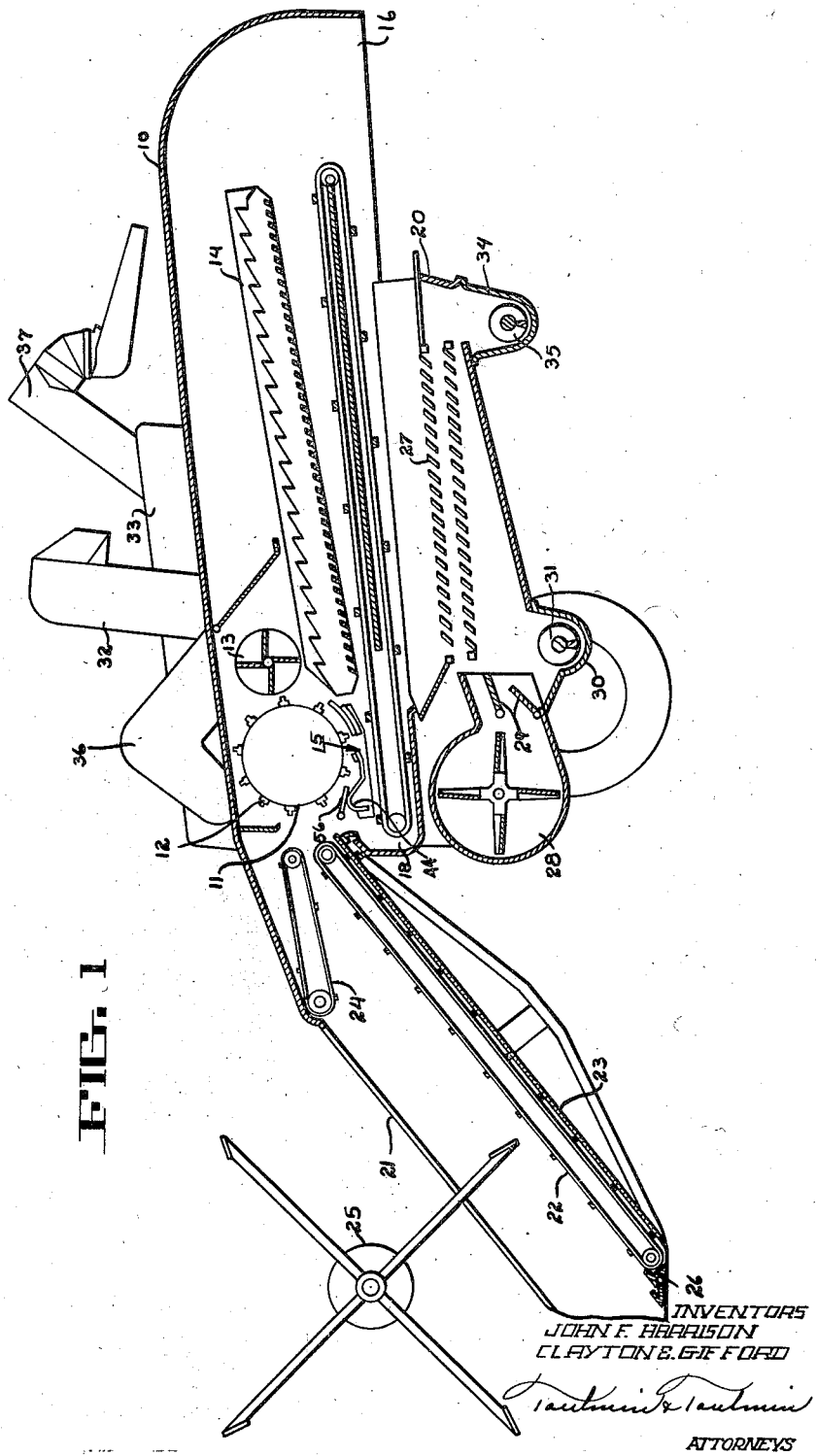

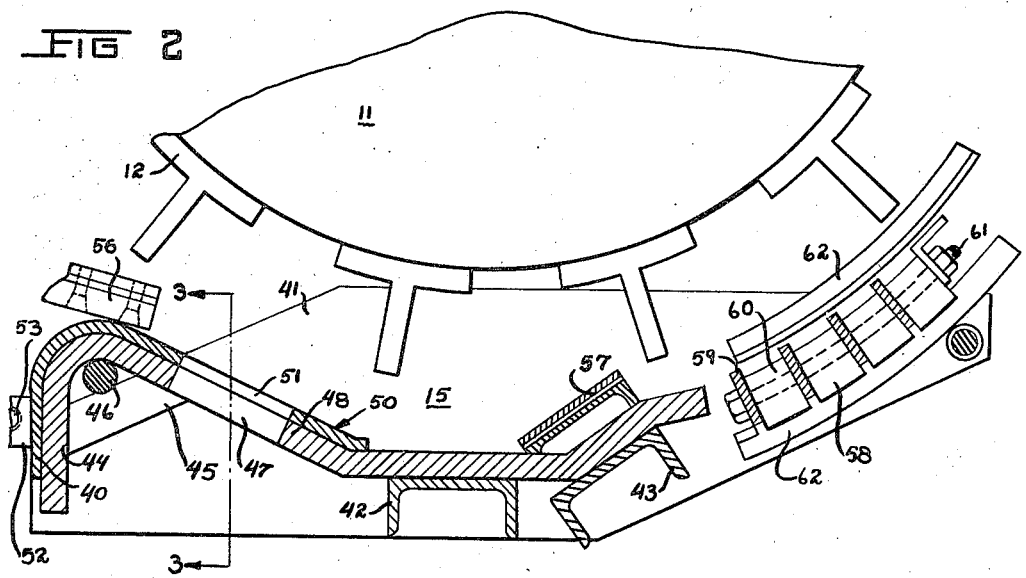
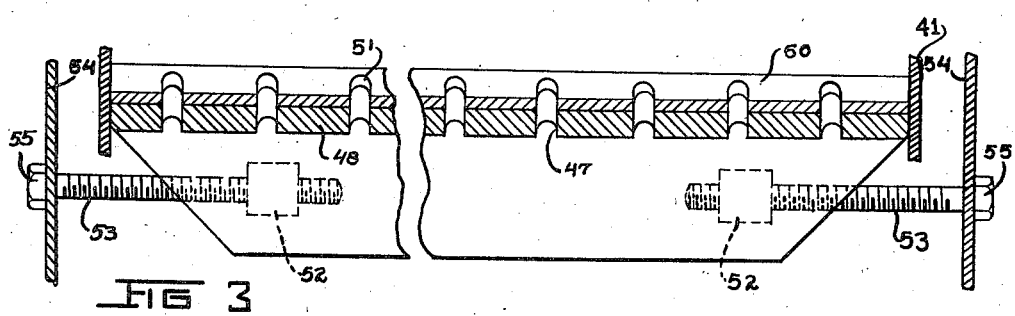
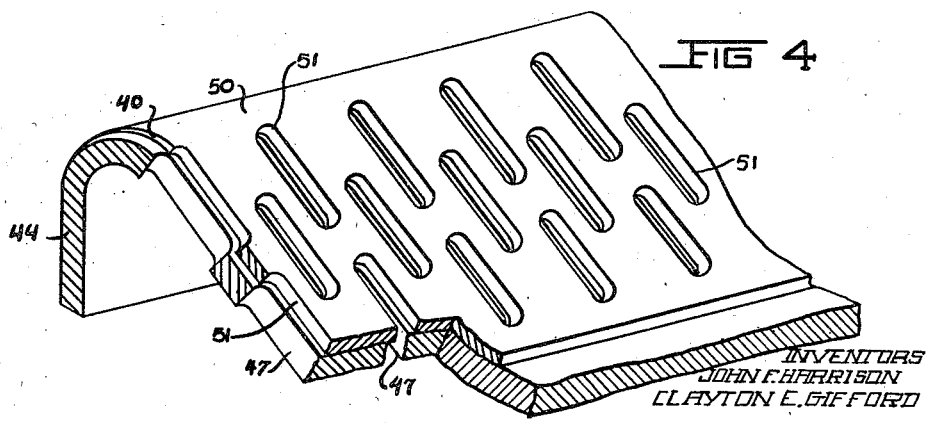

2,305,964

UNITED STATES PATENT OFFICE 2,305,964

THRESHER CONCAVE PART

John F. Harrison and Clayton E. Gifford, Marion, Ohio, assignors to The Huber Manufacturing Company, Marion, Ohio, a corporation of Ohio Application June 9, 1941, Serial No. 397,224

2 Claims. (Cl. 130—27)

This invention relates to threshing apparatus, and particularly to means for controlling the size of the openings in the grate of the concave of the threshing apparatus through which the grain passes to a suitable cleaning mill.

The purpose of a grate in the concave of a threshing cylinder is to allow threshed grain to escape from the straw as soon as it is threshed to prevent the threshed grain mingling with the straw and thus requiring separation by the action of separator racks. The conventional concave having a bar type cylinder has a forward threshing plate immediately in the rear of which there is placed additional bars. The grate that allows grain to escape is positioned to the rear of the bars thus permitting the grain to mingle with the straw. Thus, threshed grain is allowed to filter through and escape the cylinder action only after it has passed over the entire concave bed, although a large proportion of the heads may have been completely threshed at the initial impact upon the forward threshing plate at the point of entrance.

In this invention a grate is positioned directly adjacent and rearwardly of the forward threshing plate and in front of any subsequent threshing plate since in actual threshing experience it is found that a large proportion of most kinds of grain is completely threshed at the first impact at the forward threshing plate. The invention allows such threshed grain to immediately escape from the threshing elements and from the straw and chaff and prevents the same from mingling with the straw to make reseparation necessary and in addition, an early escape from the cylinder and concave threshing impacts prevents cracking of the grains that are threshed and thus not protected by chaff or hulls. This feature is very important in such crops as soya or table beans where excessive cracking very materially lowers the market value of the threshed product. As the tougher grains or heads or pods that are not threshed at the forward threshing plate must be retained, or must pass over the grate to a subsequent threshing plate where they are again subjected to threshing action, it is important that the operator have control over the size of the openings in the grate for threshing various kinds and types of grains and seeds. The openings must be large enough so the threshed grains can pass through but at the same time small enough so the unthreshed heads and pods cannot get through but are retained for further threshing action.

An object of the invention is to provide a threshing apparatus having a grain grate positioned adjacent the initial threshing device which is provided with adjustable openings therein to permit the grate openings to be adjusted to the size of the specific grain being threshed and thereby remove the maximum quantity of grain from the threshing devices immediately following the initial threshing operation to reduce fracture of the grain.

Another object of the invention is to provide a threshing apparatus wherein the grain passes through a plurality of threshing operations and wherein a grain grate having adjustable openings therein is positioned adjacent the apparatus producing the initial threshing operation to permit removal of a maximum quantity of threshed grain from the threshing apparatus at the initial threshing state with a minimum quantity of unthreshed heads, straw or trash to prevent the threshed grain passing through subsequent threshing operations and thereby reducing cracking of the grain to a minimum.

Another object of the invention is to provide a concave assembly for a threshing apparatus having a grate with adjustable openings therein positioned immediately adjacent and rearwardly of the forward threshing plate to permit maximum removal of threshed grain immediately following the initial threshing operation.

Another object of the invention is to provide a grate for a threshing apparatus having adjustable openings therein.

Another object of the invention is to provide a threshing apparatus with a grate capable of passing grain of any particular size, which grate is readily adjustable to the various sized grains being threshed by the apparatus.

It is another object of the invention to provide a grate for a threshing apparatus which has a movable plate cooperating therewith to adjust the size of the grate openings for different sized grains.

It is another object of the invention to provide a grate for a threshing apparatus having adjustable openings therein which can be readily altered to meet the varying conditions of the grain during a day's threshing period.

It is another object of the invention to provide a threshing apparatus having multiple stages of threshing with a grate positioned immediately rearwardly of the initial threshing stage which is capable of passing a maximum quantity of threshed grain in the first stage of threshing with a minimum quantity of unthreshed heads, straw or trash.

It is another object of the invention to provide a threshing apparatus having multiple stages of threshing with a grate positioned immediately rearwardly of the initial threshing plate having adjustable openings therein which can be closed when threshing fine grains and seeds.

Other objects and advantages will become apparent from the following description and drawings.

In the drawings:

Figure 1 is a longitudinal cross-sectional view of the conventional threshing apparatus, such as a combine, upon which the features of this invention are incorporated.

Figure 2 is a cross-sectional view of the concave of the threshing apparatus showing the adjustable grate member.

Figure 3 is a longitudinal cross-sectional view of a portion of the grate and is taken along line 3—3 of Figure 2.

Figure 4 is a perspective view, partially in cross-section, of the adjustable grate of this invention.

This invention relates to a grate which is associated with a threshing apparatus through which the grain passes to a suitable cleaning mill. As the grain is initially threshed from the stalk, the grate member permits the threshed grain to fall through the same but prevents unthreshed heads, straw and chaff from passing through the grate with the grain thereby separating the threshed grain from the straw.

If the openings in the grate should be slightly smaller than the largest grains, then a considerable quantity of grain passes through the initial threshing apparatus mingled with the straw and chaff and is usually crushed in subsequent threshing operations. It is therefore important that the grain shall be removed from the stalk as completely as possible upon the first threshing, and that the grain as threshed shall be permitted to fall through a grate positioned immediately rearwardly of the threshing device into the cleaning mill immediately following the initial threshing operation. If the openings in the grate are made sufficiently large that they will pass the maximum size grain or seed threshed at the initial threshing plate, unthreshed grain will pass through the openings when minimum size grain or seed is being threshed.

It is also a well recognized problem that the physical condition of grain varies from one that is dry to one that is tough or moist and the efficiency of the threshing apparatus varies accordingly. The difference between dry grain and tough grain is that more threshed grain will pass through the grate in rear of first threshing plate when the grain is dry because dry grain is easier threshed; when the grain is damp the unthreshed portions will pass over the adjustable grate if the openings are properly adjusted, and the threshing process be completed at the rear threshing plate.

The big advantage of this adjustment is when changing from one kind or type grain to another, such as from wheat to oats or timothy, or clover and more particularly to beans. Obviously a grate in this position with proper openings for threshing clover seed, for instance, a seed not much larger than the head of a pin, would not be effective when threshing beans a quarter of an inch in diameter.

To meet all these varying conditions, the conventional grates provided with an average size opening for a particular grain are unsatisfactory. This applicant has therefore provided a grate for use in combination with a threshing apparatus which has adjustable openings therein so that the grate openings can be varied in size to meet the varying grain size conditions during a day's run or can be adjusted sufficiently to change from one grain to another without requiring the necessity of altering the grate assembly itself.

The adjustable grate of this invention is positioned immediately adjacent but rearwardly of the initial threshing apparatus immediately following the initial threshing operation. Since the grate openings are adjustable the grate can pass a maximum quantity of threshed grain with a minimum quantity of unthreshed heads. Also, since a maximum quantity of threshed grain is removed in the initial or early stage of threshing, subsequent cracking of grain is practically eliminated since there is a substantially small quantity of threshed grain mingled with the straw and carried through the subsequent threshing operations.

The apparatus of this invention will be described particularly with regard a combine but it is to be understood that the invention is just as applicable to any other type of threshing apparatus having a grate associated therewith through which the grain passes.

In this invention the combine consists of a hood 10 within which the threshing apparatus and the stalk disposal apparatus are positioned. The threshing apparatus consists of a threshing cylinder 11 having a plurality of T-bars 12 secured to the face of the cylinder. The cylinder 11 consists of a plurality of individual discs or heads positioned at spaced intervals axially which are secured together by the T-bars 12, thereby providing a flailing type of threshing cylinder.

A concave assembly 15, to be hereinafter described with more particularity, is associated with the threshing cylinder 11 for removing grain from the stalk as it is carried through the combine.

A beater 13 is arranged on a parallel axis with respect the cylinder 11 for removing straw from the cylinder and directing the same onto the straw rack 14. The straw rack 14 is provided with a reciprocatory motion in the conventional manner for passing the straw from the front toward the rear of the hood 10 and disposing the same through the mouth of the hood 16. A raddle 17 is positioned below the concave 15 and the straw rack 14. The grain threshed within the concave 15, and that grain carried into the straw rack 14 falls upon the raddle 17 and is carried into the shoe 18 of the threshing machine from which it is carried by the raddle 17 into the cleaning shoe 20.

A header 21 is carried upon the hood 10 of the combine and has a lower draper 22 provided adjacent the lower wall 23, upon which the stalk is carried and directed into the threshing cylinder 11. An upper draper 24 is associated with the lower draper 22 for aiding the directing of the stalk into the threshing cylinder 11. A reel 25 is in operative association with the header 21 for directing the grain onto the draper 22. A suitable power operated sickle 26 cuts the stalk from the ground in the conventional manner.

The grain as threshed between the cylinder 11 and the concave assembly 15 is directed into the cleaning shoe 20 by means of the raddle 17. The cleaning shoe 20 is provided with a chaff and cleaning sieve 27 through which a blast of air is directed for separating the chaff from the grain. A fan 28 is provided in communication with the cleaning shoe 20 for directing a blast of air therefrom through the cleaning sieve 27. The air is under control of the wind boards 29 which are suitably adjustable for controlling the quantity of air directed through the cleaning sieve 27 in accordance with the size of the grain being handled.

The clean grain falls into a recess 30 within which there is provided a grain auger 31 which carries the clean grain to the grain elevator 32 for directing the same into the grain bin 33.

The chaff removed from the grain is blown from the hood 10 through the mouth 16 while the tailings are carried into the end of the cleaning shoe and fall into the recess 34 within which there is provided the tailings auger 35. The auger 35 carries the tailings into the tailings elevator 36 which carries the same above the threshing cylinder 11 so that the tailings can be rethreshed between the cylinder 11 and the concave 15.

A suitable unloading elevator 37 is provided for the grain bin 33.

The apparatus just described is a conventional combine adapted to be moved through the field for threshing grain of any variety. Depending upon the size of the grain being threshed, the concave assembly 15 is moved toward or away from the threshing cylinder 11 so that grains of different size can be threshed without causing breakage.

The concave assembly 15 consists of a grate 40 which has a plate secured upon each end thereof. A channel bar 42 is secured between plates 41 upon which the grate 40 rests. A second channel bar 43 is secured between the plates 41 and supports the rearward edge of the grate 40. The front edge of the grate 40 is provided with a substantially U-shaped portion 44 across which there is provided a plurality of bridges 45 for strengthening the U-shaped portion of the grate 40. A strengthening bar 46 is provided between the bridges 45 and the inner face of the U-shaped portion 44 for aiding the longitudinal strength thereof.

The grate 40 is provided with a plurality of elongated openings 47 positioned in the inclined portion 48 of the grate 40. These openings 47 have a width which is sufficient to pass the largest grain the machine is capable of threshing. The openings 47 are somewhat longer than they are wide so that the grain will have an opportunity to fall through the openings as it passes across the face of the inclined portion 48 of the grate.

An adjusting plate 50 is positioned in engagement with the upper face of the inclined portion 48 and the U-shaped portion 44 of the grate 40 so that the inner face of the adjusting plate 50 fits the contour of the portions 48 and 44. The adjusting plate 50 is provided with a plurality of elongated openings 51 which are identical in size and shape with the openings 47, and are adapted to be coaxially aligned with the openings 47 when the machine is set for threshing the largest size grain it is capable of threshing.

The adjusting plate 50 carries a pair of lugs 52 which have threaded openings therein adapted to receive bolts 53. The bolts 53 extend through the side walls or frame 54 of the combine, the heads 55 of the bolts 53 engaging the walls 54.

It may thus be readily seen that if one of the bolts 53 is loosened and the other bolt 53 is tightened with respect their cooperating lugs 52 that the adjusting plate 50 will be moved laterally with respect the grate 40. This lateral adjustment of the adjusting plate 50 varies the size of the opening provided between the openings 51 and 47. Thus, the opening provided by the grate through which the grain passes can be regulated to an infinite number of sizes, depending upon the exact condition of the grain and the maximum size of development of the grain at the particular time the machine is threshing. It may be seen that the adjustment for the grain size can be made easily during the day as conditions of the grain change.

The concave assembly 15 includes a front threshing plate 56 which is suitably faced with rubber for cooperating with the T-bars 12 on the threshing cylinder 11. The T-bars 12 are also preferably rubber faced to prevent crushing of the grain when passing between the T-bar and the threshing plate. A rear threshing plate 57 is carried upon the grate 40 and cooperates with the T-bars 12 for removing any grain which might cling to the straw after passing across the front threshing plate 56. A rear grate 58 is provided for permitting any grain threshed by the rear threshing plate 57 to fall to the raddle 17. The rear grate 58 consists of a plurality of bars 59 retained in spaced relation by spacer members 60, which assembly is secured together by means of the arcuately shaped bolts 61. The rear grate 58 is suitably carried between the plates 41 upon the arcuately shaped support members 62, which support members are secured to the plates 41.

The concave assembly 15 is suitably positioned adjacent the threshing cylinder 11 and supported upon the frame of the combine in a manner that the concave assembly is adjustable with respect to the cylinder 11 to vary the clearance between the threshing plates 56 and 57 and the T-bars 12 of the threshing cylinder 11, whereby various sized grains can be threshed upon a single machine. Since the applicant provides a grate which is adjustable as to the size of the openings therein it is no longer necessary to change the grate when changing from one grain to another, the openings in the grate being variable to an infinite number of sizes that any grain from clover to beans can be threshed in a combine using the adjustable grate device of this invention.

The adjustable openings in the grate 40 are placed immediately rearwardly of the forward threshing plate 56 so that the grain as threshed from the stalk by the cooperating action of the cylinder 11 and the plate 56 will immediately fall from the threshing apparatus onto the raddle 17. If the size of the openings in the grate 40 is properly adjusted to the particular grain being threshed, a maximum quantity of threshed grain will pass through the grate, the unthreshed heads passing over the grate to the threshing plate 57. Also, by removing the threshed grain immediately following the initial threshing operation crushing of threshed grain is practically eliminated.

When threshing the large grain crops it is desirable to remove the threshed grain from the concave as soon as possible, while threshing of the fine grain or seed crops such as clover or timothy requires a more prolonged threshing operation. When threshing the latter crops the adjustable openings in the grate can be closed to cause the fine grains, which are difficult to thresh, to travel through the concave a greater distance and to subject the grains or seeds to more than a single threshing operation.

Having thus fully described our invention, what we claim is new and desire to secure by Letters Patent is:

1. In a threshing machine, a threshing cylinder having a plurality of beater members thereon, a concave adjacent said threshing cylinder and co-operating therewith to receive material on one side of the axis of rotation of said cylinder and to discharge material on the opposite side of the axis of rotation of said cylinder whereby the material moves transversely of said cylinder, a threshing plate positioned between said concave and said cylinder on the material inlet side of said cylinder for cooperating with said beater members to thresh heads from the stalk, said concave including a plate having a substantially U-shaped bend therein providing a downwardly extending side member and having openings therein elongated in the direction of flow of the material across said concave arranged in rows transversely and longitudinally with respect to the flow of the material across said concave and disposed immediately rearwardly of said threshing plate in the direction of flow of the material across said threshing plate, a second plate slidably engaging said first plate and shaped to conform to the contour of said first plate and having openings therein elongated in the direction of flow of the material across said concave aligned longitudinally with said openings in said first plate, means engaging one of said plates in the bend of the U thereof for supporting said plates in position adjacent said cylinder, and means for moving one of said plates with respect to the other transversely with respect to the flow of material across said concave to change the transverse dimension of the opening produced between said plates to the size of head being threshed, whereby cleanly threshed heads are immediately removed from said concave and unthreshed heads are moved through said concave by said threshing cylinder.

2. In a threshing machine, a threshing cylinder having a plurality of beater members thereon, a concave adjacent said threshing cylinder and cooperating therewith to receive material on one side of the axis of rotation of said cylinder and to discharge material on the opposite side of the axis of rotation of said cylinder whereby the material moves transversely of said cylinder, a threshing plate positioned between said concave and said cylinder on the material inlet side of said cylinder for cooperating with said beater members to thresh heads from the stalk, said concave including a plate having openings therein elongated in the direction of flow of the material across said concave and disposed immediately rearwardly of said threshing plate in the direction of flow of the material across said threshing plate, a second plate slidably engaging said first plate having openings therein elongated in the direction of flow of the material across said concave aligned longitudinally with said openings in said first plate, means for moving one of said plates with respect to the other transversely with respect to the flow of material across said concave to change the transverse dimension of the opening produced between said plates to the size of head being threshed, the surface of said concave being substantially below said beater members to prevent threshing engagement of said beater members with material passing across said concave after leaving said threshing plate to permit separation of the cleanly threshed heads from the material passing across said plates to cause said heads to fall through said openings in said plates and the remainder of the material and unthreshed heads to be forwarded across said concave, and a second threshing plate disposed substantially rearwardly of said first plate in the direction of flow of the material across said concave to cooperate with said beater members to produce a second threshing operation upon the material passing across said concave and the unthreshed heads.

JOHN F. HARRISON.
CLAYTON E. GIFFORD.